United States Patent [19]

McCullough, Jr. et al.

[11] Patent Number: 4,999,236

[45] Date of Patent: Mar. 12, 1991

[54] FIRE RESISTANT SURFACES FOR HOT AIR BALLOONS

[75] Inventors: Francis P. McCullough, Jr., Lake Jackson, Tex.; Robert L. Matoy, Saginaw, Mich.

[73] Assignee: The Dow Chemical Company, Midland, Mich.

[21] Appl. No.: 363,231

[22] Filed: Jun. 8, 1989

[51] Int. Cl.⁵ .................. B32B 9/00; B32B 33/00; B64B 1/58

[52] U.S. Cl. ........................... 428/233; 244/31; 244/126; 428/236; 428/239; 428/247; 428/252; 428/408; 428/920

[58] Field of Search ............... 428/233, 236, 239, 247, 428/252, 408, 920

[56] References Cited

U.S. PATENT DOCUMENTS

| | | | |
|---|---|---|---|
| 3,519,530 | 7/1970 | Struble, Jr. | |
| 4,390,149 | 6/1983 | Barnes et al. | |
| 4,837,076 | 6/1989 | McCullough et al. | 428/224 |
| 4,844,974 | 7/1989 | McCullough et al. | 428/408 |
| 4,857,404 | 8/1989 | McCullough et al. | 428/408 |
| 4,868,037 | 9/1989 | McCullough et al. | 428/408 |
| 4,868,038 | 9/1989 | McCullough et al. | 428/408 |
| 4,869,947 | 9/1989 | Kirayoglu | 428/256 |
| 4,869,951 | 9/1989 | McCullough et al. | 428/408 |
| 4,869,962 | 9/1989 | McCullough et al. | 428/408 |
| 4,873,133 | 10/1989 | Giles | 428/408 |
| 4,879,168 | 11/1989 | McCullough et al. | 428/408 |
| 4,898,783 | 2/1990 | McCullough et al. | 428/920 |
| 4,902,561 | 2/1990 | McCullough et al. | 428/408 |

OTHER PUBLICATIONS

McCullough et al., (PCT) WO88/02695, 4/21/88.
McCullough et al., (PCT), WO89/03766, 5/5/89.

Primary Examiner—James C. Cannon

[57] ABSTRACT

The invention relates to improvements in hot air balloons and the like. An insulation of carbonaceous fibers is provided on the interior of the balloon's envelope and/or the skirt, nozzle or scoop which is light weight and provides flame and scortch protection.

7 Claims, 2 Drawing Sheets

FIRE RESISTANT SURFACES FOR HOT AIR BALLOONS

FIELD OF THE INVENTION

The present invention is directed to an improvement in hot air balloons or the like which provides a fire resistant surface to areas contacting the heated gases or combustion devices used for expanding the balloon's envelope. More particularly, the invention is directed to an improvement in a hot air balloon having an envelope and a combustion device for the balloon having an inlet nozzle, and a skirt or scoop which comprises a fibrous structure of non-flammable carbonaceous fibers forming an insulation against heated gases or surfaces of combustion devices. The insulation permits the use of higher temperature gases and causes less heat loss through the fabric which results in longer flight time, higher pay load and lower fuel requirements.

BACKGROUND OF THE INVENTION

Present hot air sport balloons include a generally sphere-like envelope having an open mouth at the lower end, and certain models include an apex opening at the upper end. The apex opening is selectively covered and uncovered by a circular valve panel, which is controllable by the pilot to permit a controlled venting or deflation of the envelope. A carriage is mounted below the mouth of the envelope for supporting the pilot and other passengers, and a gas burner is mounted on the carriage for heating the air within the envelope.

Hot air ballooning has become an increasingly popular sport in recent years. In virtually all balloons, the hot air required for buoyancy is generated by a burner which uses propane as a fuel. Typical flight durations with these balloons are from one to two hours. However, by carrying a very heavy overload of fuel, a few flights over twelve hours have been possible for hot air balloons. These long flights are for special record-breaking attempts and are not practical for the sport balloonist.

While relatively short flights of one or two hours may be acceptable to many balloonists, it would be most desirable to make longer flights as is commonly the case with gas balloons such as those containing hydrogen or helium. With gas balloons, typical flight durations are more in the range of five to fifteen hours. To make hot air balloons fly, it is necessary to heat air within the balloon sufficiently so that the mass of internal air is less than the mass of the surrounding air by an amount equal to the mass of the balloon and its load.

Additional fuel is required in order to achieve the longer flight time. However, additional fuel not only results in greater hazard because of the presence of flammable fuel but in greater weight.

Additionally, hot air balloons suffer from the problem that during pressurization of the envelope with combustion device it is necessary to hold the envelope stationary to prevent contact of the envelope with hot surfaces that may melt the thin fabric structure. This is not always possible since ballooning primarily occurs outdoors where the balloon is subjected to winds. To avoid the problems of contact with hot surfaces there have been utilized skirts or scoops about the mount or throat of the balloons which acts as a flame barrier. Also, inlet nozzles have been utilized to direct the heated gases into the mouth of the balloon. The flame barriers, skirts and scoops have been generally constructed with fabrics comprising flame retarding high performance fibers such as Kelvar, Nomex or Kynol. Unfortunately, these prior art fabrics add a large amount of additional weight and still are not effective in preventing scorching of the materials if the flame accidently contacts the fabric.

The envelopes of present balloons typically are composed of a plurality of four sided fabric panels, which are interconnected to form a number of vertical gores which extend from the mouth to the apex or deflation port. Light weight fabric such as ripstop nylon and polyester are generally used. To make the envelope non-pervious, the interior is usually coated with polyurethane. Such fabric structures have a maximum operating temperature of 250° F. Temperatures between 250° and 275° F. can only be utilized for only 10 minutes. The lower temperatures are necessary to obtain greater longevity of the fabric since it deteriorates at high temperatures and because of pollutants in the heated gases.

SUMMARY OF THE INVENTION

The present invention relates to improvements in hot air balloons or the like which provides fire resistant surfaces and further permits the use of higher operating temperatures and/or maintains the operating temperatures for longer periods of time without recharging. More particularly, there is provided a fibrous insulation for the envelope, skirt or scoop and/or the nozzle associated with a combustion device for providing heated gases.

In accordance with one embodiment of the invention, the interior of the envelope is provided with insulation comprising a fibrous structure of nonflammable heat set carbonaceous. Preferably the fibrous structure comprises non-linear fibers. The insulation is advantageously in the form of a mat or batting which is bonded to the interior wall of the envelope. The bonding agent may be a heat resistant thermoplastic or thermosetting resin. Suitable bonding materials are polyurethanes or polysiloxanes.

In accordance with another embodiment of the invention, a skirt or scoop is provided for the envelope comprising a fibrous structure of nonflammable heat set carbonaceous materials. The skirt or scoop may comprise a fabric which is woven, a densified non-woven such as a felt, knitted or the like. The fibers may be linear and/or non-linear.

In accordance with a still further embodiment an insulation for the nozzle of the combustion device or a scoop is provided which comprises the carbonaceous materials. The insulation for the combustion device or scoop would permit immediate implementation of the invention to provide a fire resistant barrier for the balloon during the charging of the envelope with heated gases.

In a yet still further embodiment of the invention there is provided a fabric structure which can be utilized for inflatable structures such as balloons and domes, tents or other ground installations. The fabric structure comprises a light weight fabric which is bonded to a carbonaceous mat or batting through a flexible adhesive and/or polysiloxane layer which also make the fabric air impervious.

It is therefore an object of the invention to provide a non-flammable light weight insulation for the envelopes of hot air balloons which permits operation of the balloons at higher temperatures without degradation of the fabric of the envelope.

It is a still further object to provide insulation for a hot air balloon which will result in long flight time and provide faster lift time.

It is a yet still further object of the invention to insulate hot air balloons against heated surfaces without any substantial increase in weight.

Some of the objects and advantages of the invention have been stated, others will appear from the description of the preferred embodiments when taken in connection with the accompanying drawings wherein.

DESCRIPTION OF THE PREFERRED EMBODIMENTS

Figure 1:
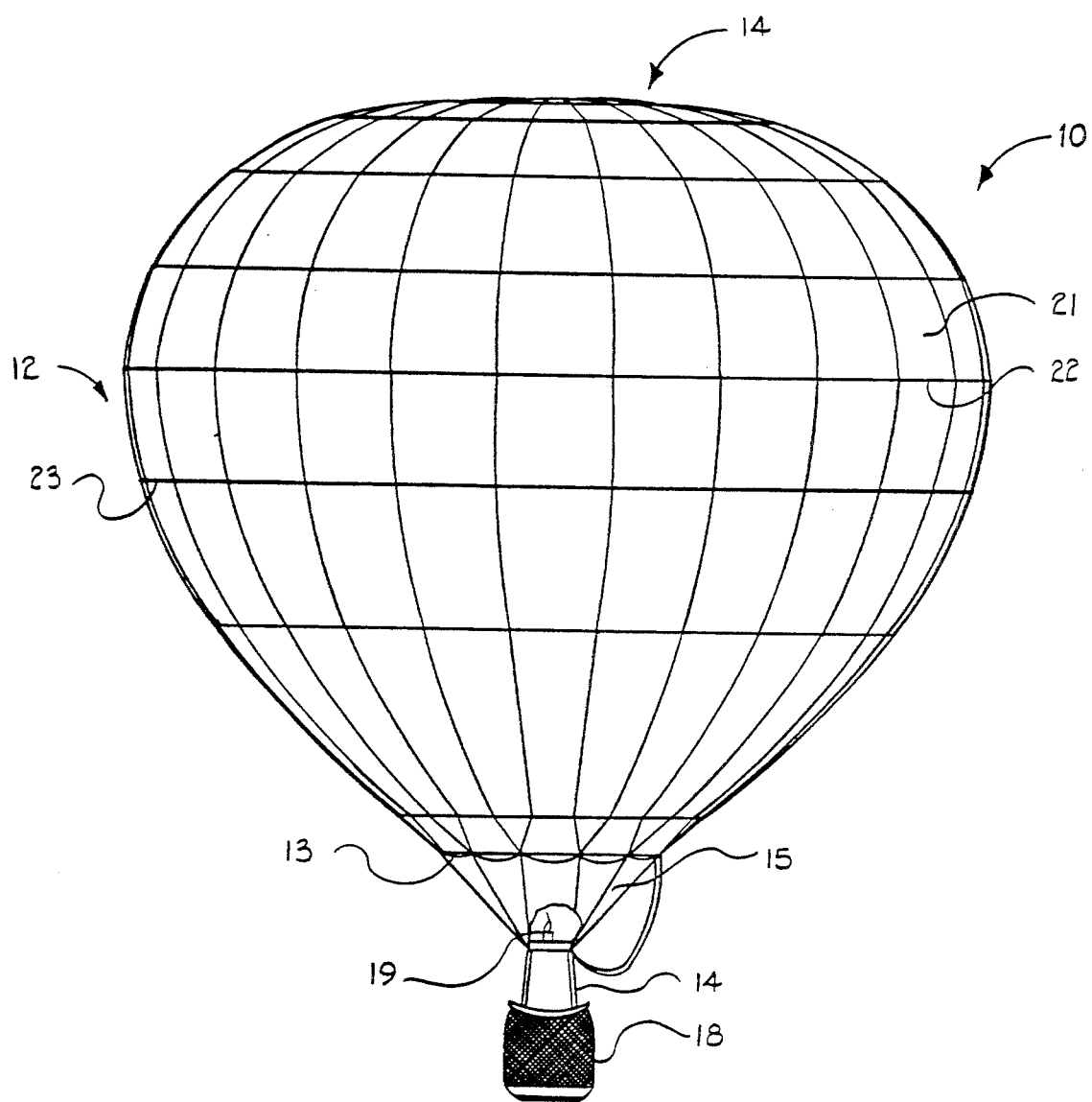
FIG. 1 is a front view of a hot air balloon with the insulation of the invention.

Referring more specifically to the drawings, FIG. 1 illustrates generally at 10 a hot air balloon which embodies the present invention. The balloon includes an envelope 12 of generally spherical configuration when inflated, and the envelope includes an open mouth 13 at the lower end and an upper end or apex 14. Typically, such envelopes have a volume when inflated of between about 900 to 3000 cubic meters. A relatively large circular opening is provided at the apex of the envelope, and a manually operable circular valve panel is mounted within the envelope adjacent the opening for selectively covering and uncovering the opening, and thus permitting controlled venting or deflation of the envelope by the pilot. A valve of this construction is presently known and utilized in the art.

The balloon 10 further includes a conventional carriage 18 mounted by supports 14 immediately below the mouth 13 of the envelope for supporting the pilot and passengers. In addition, the carriage 18 mounts a gas burner 19 or other heating means of conventional design for heating the air within the envelope, and thus causing the envelope to lift the entire balloon.

A skirt 15 may be provided directly above the carriage 18. This skirt 15 shelters the burner 19 from excessive wind currents and improves the overall efficiency of operation of the burner 19.

Figure 2:
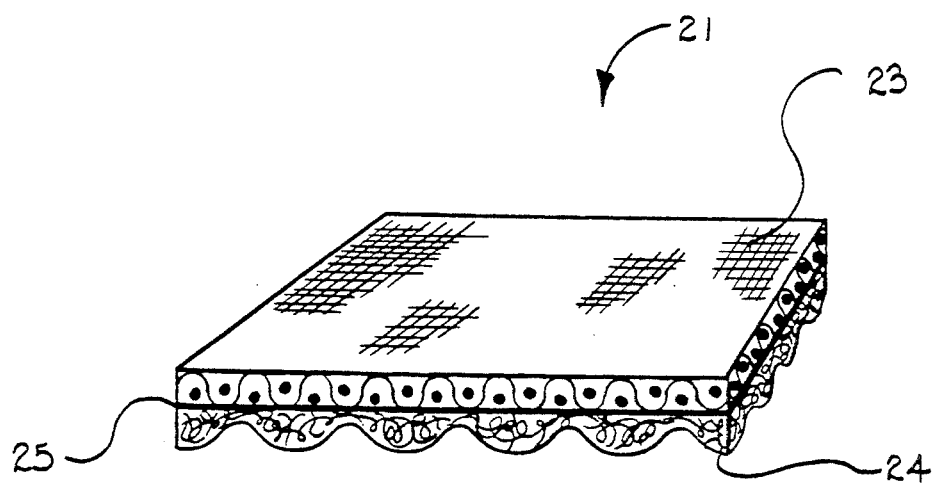
FIG. 2 is a perspective view in cross-section of a portion of the balloon envelope.

The envelope may be constructed by use of gores 21 joined at seams 22. As shown in FIG. 2, the gore is constructed of a high strength woven fabric 23, for example, ripstop nylon, which is coated with polyurethane adhesive or polysiloxane 25 that makes the fabric 23 gas impermeable and bonds the carbonaceous, fiber mat 24. Optionally, the carbonaceous fiber mat is covered with a polysiloxane film for further protection of the interior against degrading gases. Generally, the entire interior of the envelope 10 need not be provided with carbonaceous mat 24 since the hot gases rise to the top of the envelope 10. Preferably, the envelope 10 from the equator 23 is covered with the insulation 24. The insulation or mat maintains the heat within the envelope by insulating against the cold atmosphere, especially at high altitudes. Consequently, the flights are longer since recharging needs are lessened.

Figure 3:
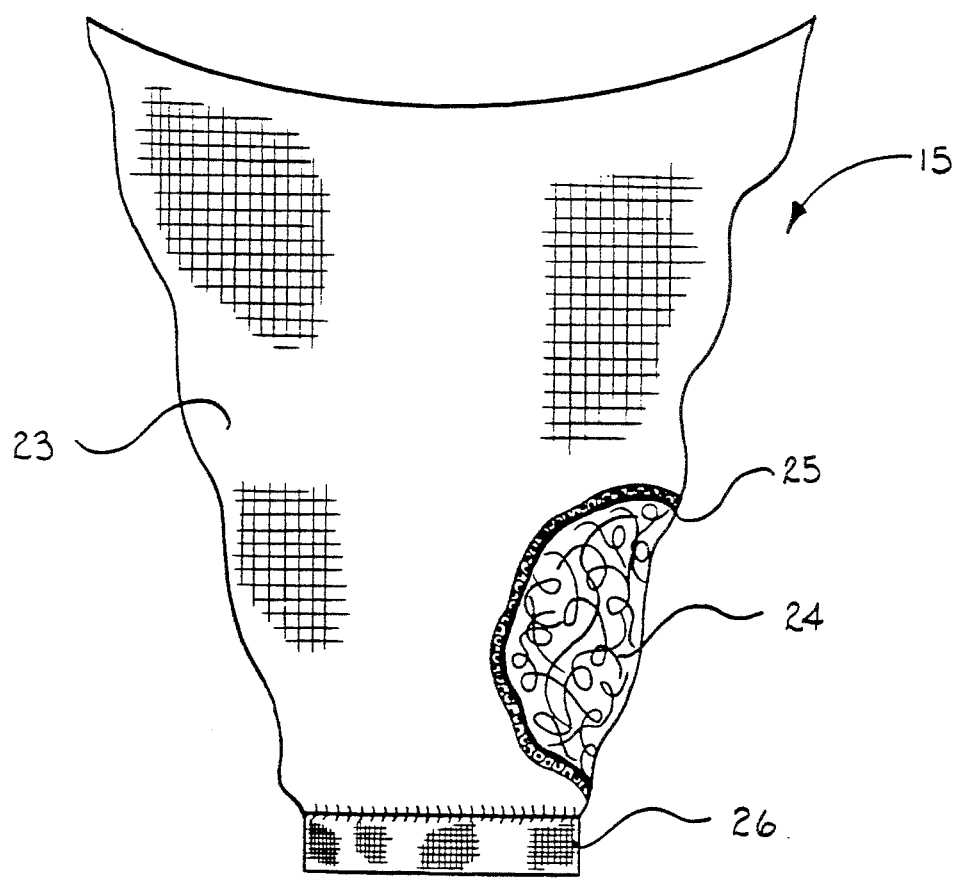
FIG. 3 is a front view of a skirt of the balloon of FIG. 1.

As seen in FIG. 3, a skirt 15 and skirt hoop 26 are provided which are used integrally with the envelope. Advantageously, the skirt 15 is made of carbonaceous materials which comprises a woven fabric 27 and optionally a mat or batting 24. The mat may be formed by needle punching or thermally bonded with a polyester. The skirt 15 serves as a shielding device to protect the burner 19 against gust conditions and uneven burning effects. The skirt 15 further provides a means of venting heavy combustion gases from the main envelope through a series of semi-circular vents (not shown) located at the union of the skirt and the main balloon. The use of the carbonaceous materials in lieu of the usual non-flammable skirt materials reduces the weight and improved protection against scorch and flame.

If desired, the nozzle of the burner 19 may be provided with a covering or fabric similar to the skirt or a scoop.

The fibers utilized in the structures of the present invention, herein referred to herein, and their method of preparation are those described in U.S. patent application Ser. No. 856,305, entitled "Carbonaceous Fibers with Spring-Like Reversible Reflection and Method of Manufacture," filed 4-28-86, by McCullough et al.; incorporated herein by reference and in U.S. patent application Ser. No. 918,738, entitled "Sound and Thermal Insulation," filed, 10-14-86, by McCullough et al.; incorporated herein by reference.

Preferably, the fibers utilized in the structures of the invention comprise a multiplicity of resilient non-linear carbonaceous fibers having a reversible deflection of at least about 1.2:1 and an aspect ratio (l/d) greater than 10:1. The non-linearity of the fibers improves the thermal insulation of the mat or batting because of its porocity. In addition, the non-linearity provides shape reforming properties.

The non-linear carbonaceous fibers utilized may be linear or possess a sinusoidal or a coil-like configuration or a more complicated structural combination of the two. These first carbonaceous fibers may also be a combination of linear and non-linear heat set fibers.

The present invention is particularly concerned with fibrous structures comprising a multiplicity of non-flammable, linear or non-linear carbonaceous or carbon filaments having a carbon content of at least 65% such as described in copending application Ser. No. 856,305. These filaments particularly identified by the degree of carbonization and/or their degree of electrical conductivity in the determination of the particular use for which they are most suited.

The first carbonaceous fibers or matrix fibers can be prepared by heat treating a suitable stabilized precursor material such as that derived from an assembly of stabilized polyacrylonitrile based materials or pitch base (petroleum or coal tar), polyamid or other polymeric materials which can be made into linear or non-linear fiber or filament structures or configurations and are thermally stable.

For example, in the case of polyacrylonitrile (PAN) based fibers, fibers formed by melt or wet spinning a suitable fluid of the precursor material and having a normal nominal diameter of from about 4 to 25 micrometers, are collected as an assembly of a multiplicity of continuous filaments in tows and stabilized by oxidation (in the case of PAN based fibers) in the conventional manner. The stabilized tows (or staple yarn made from chopped or stretch broken fiber staple) are thereafter, formed into a coil-like and/or sinusoidal form by knitting the tow or yarn into a fabric or cloth (recognizing that other fabric forming and coil forming methods can be employed).

The so-formed knitted fabric or cloth is thereafter heat treated, in a relaxed and unstressed condition, at a temperature of from about 525 to about 750 degrees C., in an inert atmosphere for a period of time to produce a heat induced thermoset reaction. At the lower temperature range of from about 150 to about 525 degrees C., the fibers are provided with a varying proportion of temporary to permanent set while in the upper range of temperatures the fibers are provided with a permanently set configuration. What is meant by permanently set is that the fibers possess a degree of irreversability in their chemical and physical characteristics.

It is, of course, to be understood that the fiber or fiber assembly may be initially heat treated at the higher range of temperatures so long as the heat treatment is conducted while the fibers are in a relaxed or unstressed state and under an inert, non-oxidizing atmosphere. As a result of the higher temperature treatment, a permanently set or configuration or structure is imparted to the fibers in yarns, tows or threads.

The resulting fibers, tows or yarns having the non-linear structural configuration which are derived by deknitting the cloth, are subjected to other methods of treatment know in the art to create an opening, a procedure in which the yarn, tow or the fibers or filaments of the cloth are separated into a non-linear, entangled, wool-like fluffy material in which the individual fibers retain their coil-like or sinusoidal configuration yielding a fluff or batting-like body of considerable loft.

The stabilized non-linear fibers permanently configured into the desired structural configuration, e.g., by knitting, and thereafter heating at a temperature of greater than about 550 degrees C. retain their resilient and reversible deflection characteristics. It is to be understood that higher temperatures may be employed of up to about 1500 degrees C., but the most flexible and smallest loss of fiber breakage, when carded to produce the fluff, is found in those fibers and/or filaments heat treated to a temperature from about 525 to 750 degrees C.

The precursor stabilized acrylic filaments which are advantageously utilized in preparing the fibers of the structures are selected from the group consisting of acrylonitrile homopolymers, acrylonitrile copolymers and acrylonitrile terpolymers. The copolymers preferably contain at least about 85 mole percent of acrylonitrile units and up to 15 mole percent of one or more monovinyl units copolymerized with styrene, methylacrylate, methyl methacrylate, vinyl chloride, vinylidene chloride, vinyl pyridine, and the like. Also, the acrylic filaments may comprise terpolymers, preferably, wherein the acrylonitrile units are at least about 85 mole percent.

The non-linear form can be prepared by imparting to the fibers a temporary non-linear shape by heat treating the fibers at a temperature range of from about 150 to about 525 degrees C. The fibers are provided with a varying proportion of temporary to permanent set at this temperature range. The fibers are then permanently set by chemically treating or heat treating the structure after the interlocking step. Preferably, the heat treatment is at an upper range of temperatures of from about 525 degrees C. and above such that the fibers are provided with a permanent shape set.

The type of carbonaceous fibers utilized in the invention may be classified into two groups.

In a first group, the carbonaceous fibers used in the structure of the present invention are non-flammable and non-electrically conductive.

The term non-conductive as utilized in the present application relates to a resistance of greater than $10^7$ ohms per inch on a 6K tow formed from fibers having a diameter of 7-12 microns.

In a second group, the non-flammable non-linear carbonaceous fibers used in the structure of the present invention are classified as being partially electrically conductive (i.e., having low conductivity) and have a carbon content of less than 85%. When the precursor stabilized fiber is an acrylic fiber, i.e., a polyacrylonitrile based fiber, the percentage nitrogen content is from about 10 to 35%, preferably, from about 16 to 22%. The structures formed therefrom are lightweight, have low moisture absorbency, good abrasive strength together with good appearance and handle.

The larger the amount of carbon content of the fibers utilized, the higher the degree of electrical conductivity. These high carbon filaments still retain a wool-like appearance when formed into a mat or a batting especially when the majority of the fibers are coil-like. Also, the greater the percentage of coil-like fibers in the structure, the greater is the resiliency of the structure. These filaments have greater sound absorbing properties and result in a more effective thermal barrier at higher temperatures. Low conductivity means that a 6K tow of fibers has a resistance of about $10^7$–$10^4$ ohms per inch.

Exemplary of the present invention is set forth in the following examples:

EXAMPLE 1

A. A non-linear carbonaceous fiber which had been heat treated to 550 degrees C. and opened on a Shirley was blended with 25% by weight Dogbone shaped larger denier OPF (oxidized PAN fiber) obtained from RK Carbon Fibers, Inc. of Philadelphia, Pa. The Dogbone OPF had a temporary crimp set in at 200 degrees C. prior to blending. Battings were combined and run through a needle punch machine and densified from 3 inches thick to about ¾ inch thick with the same precursor fibers.

B. The resulting densified batting or felt from Part A which contained the Dogbone OPF lock stitches was heat treated at 700 degrees C. under a nitrogen atmosphere for 60 minutes. The resulting felt had good permanent integrity and was stable to a temperature greater than 400 degrees C.

The felt could be used to insulate the interior of the envelope, the skirt or the carriage.

EXAMPLE 2

A balloon envelope (Raven S-55A) having a volume capacity of 77,500 cu. ft. was provided with about 30 lbs. of carbonaceous batting about the upper portion of the equator. The balloon with rigging, skirt hoop, equipped with standard instrumentation, a burner and 10 lbs. of propane had a gross pre-launch weight of 544 lbs.

The maximum weight for lift to 3000 feet pressure altitude calculated was at an ambient temperature of 60 degrees Fahrenheit as follows:

| Envelope Temperature adjacent batting (degrees Fahrenheit) | Gross lift weight (lbs.) |
| --- | --- |
| 230 | 1040 |
| 250 | 1115 |
| 275 | 1300 |

EXAMPLE 3

Following the procedure of Example 1, the maximum weight for lift to 3,000 feet at pressure altitude an ambient temperature of 60 degrees Fahrenheit was calculated as follows:

| Envelope Temperature adjacent batting (degrees Fahrenheit) | Gross lift weight (lbs.) |
| --- | --- |
| 230 | 1340 |
| 250 | 1455 |

EXAMPLE 4

Following the procedure of Example 1, the maximum weight for lift to 10,000 feet pressure altitude at an ambient temperature of 60 degrees Fahrenheit was calculated as follows:

| Envelope Temperature adjacent batting (degrees Fahrenheit) | Gross lift weight (lbs.) |
| --- | --- |
| 230 | 1040 |
| 250 | 1115 |
| 275 | 1300 |

Operation of the balloon at a higher temperature than 230 degrees Fahrenheit permits the carrying of additional fuel which will maintain longer flight time.

What is claimed is:

1. A composite fabric comprising, in combination a woven outer ply of light weight fabric selected from the group consisting of polyester and ripstop nylon, and
an inner layer of a fibrous structure comprising nonflammable heat set carbonaceous polymeric fibers having an LOI value greater than 40, an aspect ratio greater than 10:1, a carbon content less than 85% and a thermal conductivity less than 1 BTU ft/Hr ft.$^2$°F. bonded to said outer ply.

2. The composite fabric of claim 1 wherein said inner layer is bonded to said outer ply with a thermosetting or thermoplastic resin.

3. The composite fabric of claim 2 wherein said resin is a polyurethane or a polysiloxane.

4. The composite fabric of claim 1 wherein the carbonaceous fibers comprise non-linear, shape reforming and elongatable fibers having a deflection ratio of greater than 1.2:1.

5. The composite fabric of claim 1 wherein said carbonaceous fibers are derived from stabilized acrylic fibers.

6. The composite fabric of claim 5 wherein said acrylic fibers comprise polyacrylonitrile.

7. The composite fabric of claim 1 wherein said inner fibrous structure comprises a needle punched batting.

* * * * *